May 7, 1935.  V. E. CARBONARA  2,000,659
MEASURING INSTRUMENT
Filed June 13, 1931
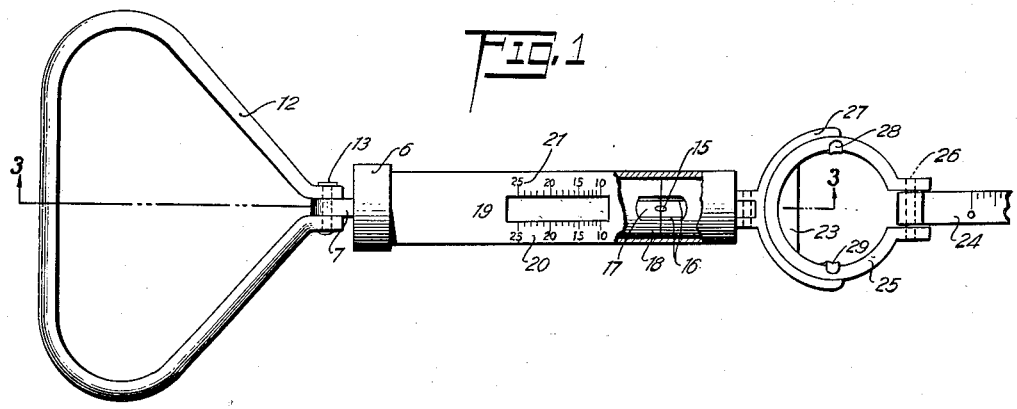
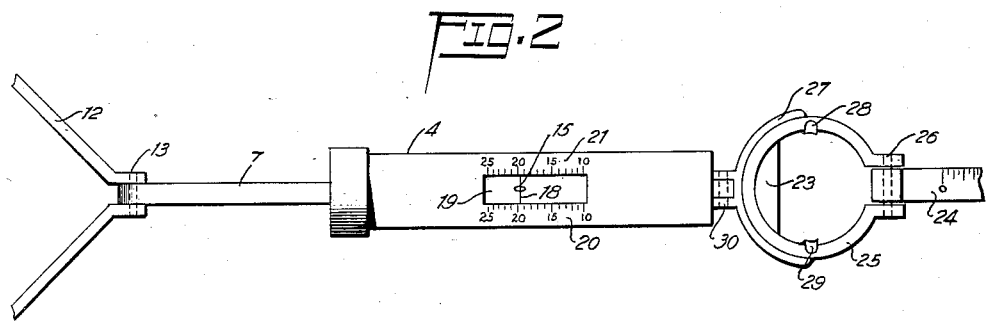
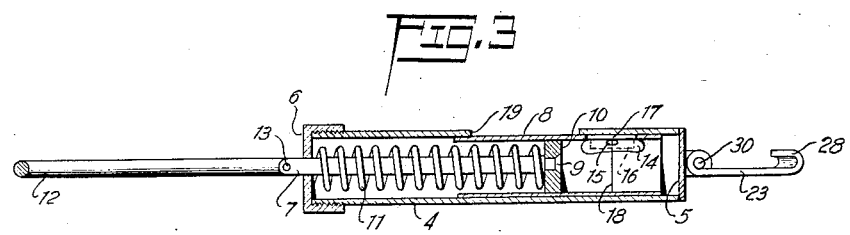
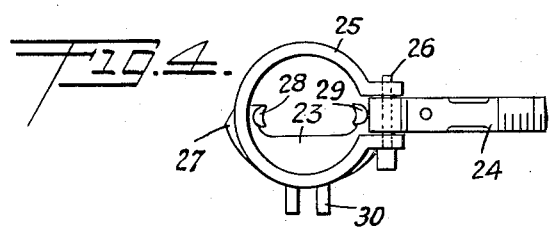
INVENTOR
*Victor E. Carbonara*
BY
*F. B. Smith*
ATTORNEY Patented May 7, 1935

2,000,659

UNITED STATES PATENT OFFICE 2,000,659

MEASURING INSTRUMENT

Victor E. Carbonara, Brooklyn, N. Y., assignor to Pioneer Instrument Company, Incorporated, Brooklyn, N. Y., a corporation of New York Application June 13, 1931, Serial No. 544,210

1 Claim. (Cl. 33—137)

The present invention relates to measuring instruments and more particularly to instruments of the type which are employed in measuring and laying off distances, and which must be held in a predetermined position in order to obtain accurate measurements.

A familiar form of instrument of the above type is what is known as surveyors' tape scales which comprise a calibrated spring balance to which a measuring tape may be secured. The scales are calibrated in such a manner that readings on the tape will be accurate when the scales are stretched with a given force for a given distance to maintain a definite tension on the tape and when both ends of the tape are level. A liquid-level is generally employed for the latter purpose and is usually embodied in the scales. In instruments of this type, however, it has been the practice, heretofore, to employ two reference lines or indices, one for the liquid-level and one for the scale, and the tape was secured more or less rigidly at the end of the scales thereby rendering it difficult to obtain accurate readings and preventing self-alignment of the scales and tape.

It is obvious that with two reference lines or indices on the scales, the operator or surveyor was required to observe two indices which were spaced apart before an accurate measurement could be obtained, and this was practically impossible to do simultaneously. The operator had to continually shift his line of vision from one reference line or index to the other and while observing the reference line associated with the level, the indication on the scale of the spring balance would shift and then when observing the indication on the spring balance, the level of the instrument would change. Accordingly, one of the objects of the present invention is to provide a novel instrument of the class described, wherein the foregoing difficulties are eliminated.

Another object is to provide in an instrument wherein two predetermined conditions of observation are required to obtain an accurate reading, novel means whereby a single observation will give an indication of both conditions.

Another object is to provide in an instrument adapted to be employed with a distance measuring device, novel means whereby tension on the distance measuring device and the relation of the latter to the horizontal may be obtained from a single observation.

Another object is to provide in a device of the class described including a spring balance and a liquid-level, novel means including a single reference line or index whereby a reading on the spring balance and an indication on the level may be obtained simultaneously from a single observation of the reference line.

Another object is to provide in an instrument adapted to be employed with a measuring tape and including a spring balance and a liquid level for indicating the tension on the tape and the relation of the latter with respect to the horizontal respectively, a novel arrangement and association of the level with the spring balance whereby the level is brought into view only upon operation of the spring balance and embodying a single reference line or index so that a reading on the spring balance and an indication of the level may be obtained from a single observation.

Still another object is to provide in a measuring device embodying a spring balance and liquid-level adapted to be employed with a measuring tape, novel means for securing the latter to the instrument so that the spring balance and tape may be readily aligned and the twisting of the tape prevented.

A still further object is to provide in a measuring instrument including a spring balance and a liquid level, a novel arrangement and association of the spring balance and level whereby the latter is concealed from view and protected from breakage when the spring balance is not under tension.

The above and other objects and advantages of the invention will appear more fully hereinafter from a consideration of the detailed description which follows, taken together with the accompanying drawing wherein is illustrated one embodiment of the invention. It is to be expressly understood, however, that the drawing is for the purpose of illustration and description only and is not designed as a definition of the limits of the invention, reference being had for this purpose to the appended claim.

In the drawing, wherein like reference characters refer to like parts throughout the several views;

Fig. 1 is a plan view with a portion broken away of one form of instrument embodying the present invention;

Fig. 2 is a view similar to Fig. 1 showing the instrument in operation and illustrating the novel feature of the invention;

Fig. 3 is a longitudinal section taken on the line 3—3 of Fig. 1; and

Fig. 4 is a detail view showing the manner in which the tape measure may be removed from the scales in only one position.

As pointed out above, the instrument embodying the present invention comprises a liquid-level combined with a spring balance and means for securing a measuring tape to the former so that tension on the tape and the relation of said tape with respect to the horizontal may be determined.

In the form shown, the spring balance is constituted by a main cylindrical tube 4 which may have one end thereof permanently closed, as indicated at 5, and may be formed of any suitable metal, preferably sheet metal, formed into tubes of the desired length. The other end of the tube 4 may be closed in any suitable manner, as by means of a cap 6 screwed thereto and which is provided with an opening through which a rod 7 is adapted to pass. A secondary or auxiliary tube 8 is provided and arranged to slide within the main tube 4. The rod 7 is secured to the auxiliary tube 8 in any suitable manner as by means of a rivet 9 and the disc 10 rigidly secured to or formed integral with the tube 8. A calibrated spring 11 is provided which encircles the rod 7 and abuts against the cap 6 and the disc 10 so that it may be compressed when the rod 7 is pulled outwardly to the left, as viewed in the drawing, by means of a handle member 12 which is pivotally connected to the rod 7, as indicated at 13.

A liquid-level 14 having a bubble 15 is secured to the auxiliary tube 8 in any suitable manner, as by means of brackets 16 which are formed by the punching in of the metal of the tube 8 to provide an opening 17 through which the level may be viewed. A reference line or index 18 is also provided which is positioned centrally of the liquid-level and circumferentially of the tube 8 so that the bubble may be centralized relative to the reference line to indicate an absolutely level or horizontal position of a measuring tape secured to the instrument. The level 14 is so located within the tube 8 that it can be viewed only when the rod 7 is pulled outward against the tension of the spring 11, at which time the opening 17 is brought into coincidence with a corresponding opening 19 formed in the main tube 4. Scales 20 and 21 are provided on each side of the opening 19 and are marked in terms of pounds of tension exerted by the rod 7 against the calibrated spring 11. A reading is obtained from the scales 20 and 21 by observing the position of the reference line or index 18 with respect thereto.

A hook or clamp 23 is pivotally secured to the end 5 of the main tube 4 by means of a pin 30 so that a measuring tape 24 may be attached thereto by means of a ring 25 which is pivotally connected to the tape as indicated at 26. The hook or clamp 23 comprises a semi-circular portion 27 at the ends of which are provided fingers or curved projections 28 and 29 which serve to hold the ring 25 in engagement with the hook which is so designed that the ring may be engaged and disengaged therefrom only in one position as illustrated in Fig. 4, namely, when the tape is at right angles to the longitudinal axis of the instrument, thereby preventing unintentional disengagement therebetween and permitting the ring 25 to be turned through an angle of approximately 160 degrees without twisting the tape.

It will be apparent from the foregoing that if it be desired to obtain a measurement of a distance or to lay off a distance, the measuring tape 24 is secured to the spring balance by means of the hook or clamp 23 and the ring 25 and then a tension is exerted on the tape through the spring balance by pulling the handle 12 until the bubble 15 comes into view in the opening 19 and the reference line or index 18 coincides with the scale indication of the poundage which it is desired to exert on the tape for the particular distance to be measured, and while the reference line 18 is in this position, the bubble 15 may also be centralized relative thereto without losing the indication on the spring balance. In this manner a single observation of the reference line or index 18 gives an indication of the two conditions essential for the obtaining of an accurate reading on the tape, viz., the required tension thereon and the relation thereof with respect to the horizontal. When the measurement is obtained, the tension on the spring 11 is released and the liquid-level 14 is immediately concealed within the tube 4 so that it cannot be easily broken when the instrument is not in use.

There is thus provided a novel instrument of the class described which is compact and easily manipulated and which reduces the operations required in measuring distances to a minimum. By the novel arrangement and association of the liquid-level and the spring balance, the errors due to the variable characteristics of persons operating the instrument are eliminated.

While only one embodiment of the invention has been illustrated and described, changes and modifications in the construction and relative arrangement of the parts which will now appear to those skilled in the art, may be made without departing from the scope of the invention. Reference is therefore to be had to the appended claim for a definition of the limits of said invention.

What is claimed is:

In a surveyor's device, the combination of a hook for securing a measuring tape to said device, said hook having a semi-annular portion at the end of which are provided curved fingers projecting upwardly from the plane of the hook and outwardly of the semi-annular portion, and a ring adapted to be engaged by the hook and having a gap in its circumference and having the ends which form the gap projecting from the periphery of the ring in order that a measuring tape may be fastened to said ends, said hook being adapted to engage said ring only when the ring is over the semi-annular portion and so positioned that one or the other of the curved fingers of the hook is in the gap, and after engagement of the ring by the hook the curved fingers engage the ring on opposite sides of the gap.

VICTOR E. CARBONARA.